United States Patent
Jin et al.

(10) Patent No.: US 11,276,123 B2
(45) Date of Patent: *Mar. 15, 2022

(54) SYSTEM AND METHOD FOR A REVENUE ALLOCATION ENGINE FOR USE WITH SUBSCRIPTION ECONOMY

(71) Applicant: Zuora, Inc., Redwood City, CA (US)

(72) Inventors: Lei Jin, Redwood City, CA (US); John Banks, Los Altos, CA (US); Kang Ao, Beijing (CN); Muyun Zhu, Jiujiang (CN)

(73) Assignee: Zuora, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,648

(22) Filed: Nov. 5, 2019

(65) Prior Publication Data
US 2020/0167873 A1 May 28, 2020

Related U.S. Application Data

(63) Continuation of application No. 14/626,748, filed on Feb. 19, 2015, now Pat. No. 10,467,705.

(60) Provisional application No. 61/942,211, filed on Feb. 20, 2014.

(51) Int. Cl.
*G06Q 40/00* (2012.01)
(52) U.S. Cl.
CPC .............. *G06Q 40/12* (2013.12); *G06Q 40/00* (2013.01)
(58) Field of Classification Search
CPC ................................ G06Q 40/02; G06Q 40/12
See application file for complete search history.

(56) References Cited

U.S. PATENT DOCUMENTS

| 7,330,717 B2* | 2/2008 | Gidron | G06Q 30/04 455/405 |
|---|---|---|---|
| 7,418,426 B1 | 8/2008 | Reunert et al. | |
| 8,135,633 B1 | 3/2012 | LeBaron et al. | |
| 8,204,809 B1 | 6/2012 | Wise | |

(Continued)

OTHER PUBLICATIONS

Dempsey, David, and Felicity Kelliher. "Recurring Revenue Model in Practice." Industry Trends in Cloud Computing. Palgrave Macmillan, Cham, 2018. 139-183. (Year: 2018).*

(Continued)

*Primary Examiner* — Asfand M Sheikh
(74) *Attorney, Agent, or Firm* — Sheppard, Mullin, Richter & Hampton LLP

(57) ABSTRACT

Systems, apparatuses, and methods for the recognition and allocation of revenue generated by a subscription based pricing model or plan that is applied to a product or service. Embodiments respond to customer needs for a flexible and powerful revenue allocation engine to permit correct revenue distribution within a subscription economy and effectively trace changes to a revenue schedule and the resulting revenue recognition. Embodiments can efficiently react to changes to a subscription agreement and calculate a new distribution for a revenue schedule and its impact on revenue recognition and future revenue projections. In one embodiment, the systems and methods includes a revenue recognition/allocation engine that operates to evaluate the impact of "charge events" on revenue generation, taking into account relevant business rules and revenue recognition principles.

20 Claims, 8 Drawing Sheets

(56) References Cited

U.S. PATENT DOCUMENTS

| | | | |
|---|---|---|---|
| 8,798,576 B2 * | 8/2014 | Krishnamoorthy | G06Q 40/00 |
| | | | 455/406 |
| 8,918,506 B1 | 12/2014 | Clubb et al. | |
| 10,152,755 B2 | 12/2018 | Balsundaram et al. | |
| 10,311,522 B1 | 6/2019 | Jin et al. | |
| 2004/0111346 A1 | 6/2004 | Macbeath et al. | |
| 2005/0171873 A1 | 8/2005 | Alberti et al. | |
| 2005/0222928 A1 | 10/2005 | Steier et al. | |
| 2006/0064370 A1 | 3/2006 | Mojsilovic et al. | |
| 2006/0149643 A1 | 7/2006 | Reiner et al. | |
| 2006/0235773 A1 | 10/2006 | Nelson et al. | |
| 2007/0168209 A1 | 7/2007 | Shah | |
| 2008/0033873 A1 | 2/2008 | Krishnamoorthy et al. | |
| 2009/0216582 A1 | 8/2009 | Moran | |
| 2013/0073521 A1 | 3/2013 | Ng et al. | |
| 2014/0101008 A1 | 4/2014 | Dennis | |
| 2014/0114709 A1 | 4/2014 | Olsen et al. | |

OTHER PUBLICATIONS

IFRS Foundation, "IFRS 15 Revenue from Contracts with Customers", International Financial Reporting Standard, May 2014, 88 pages.

Leeyo Software Inc., "New Revenue Recognition Standard ASU 2014-9", 2013, 11 pages.

Financial Accounting Standards Board, "Accounting Standards Update No. 2014-09: Revenue from Contracts with Customers (Topic 606)", May 2014, 154 pages.

Li et al., "Resource allocation and revenue optimization for cloud service providers", Decision Support Systems, 2015, vol. 77, pp. 55-66.

* cited by examiner

SYSTEM AND METHOD FOR A REVENUE ALLOCATION ENGINE FOR USE WITH SUBSCRIPTION ECONOMY

CROSS REFERENCE TO RELATED APPLICATIONS

This application is a continuation of U.S. Nonprovisional application Ser. No. 14/626,748, entitled "System And Method For A Revenue Allocation Engine For Use With Subscription Economy," filed on Feb. 19, 2015, which claims the benefit of U.S. Provisional Application Ser. No. 61/942,211, entitled "Revenue Allocation Engine for Use with Subscription Economy," filed Feb. 20, 2014, which are incorporated by reference in their entirety herein for all purposes.

BACKGROUND

Many products and services are implemented in a manner that includes one or more components, support services, conditional features, optional services, utilities, and/or resources (such as computing resources). Each of these implementation requirements or options may have an associated cost, including a financial cost based on an applicable pricing model. As a convenience to their customers, vendors typically attempt to simplify pricing for products and services into a single payment or a simple recurring payment. However, the complex and changing nature of the modern business environment can cause such efforts at pricing simplification to be inadequate or problematic. For example, different customer usage patterns can mean that a flat fee is too high or too low for a particular customer, as it may not properly reflect the value of their actual usage of a service. As a result, more flexible pricing plans, such as subscription based plans, have been developed and offered to customers. Presumably, such plans can more accurately determine the actual value (and cost) to a customer of using a product or service by taking into account the various aspects of that product or service that can generate a charge to the customer. Such plans may therefore serve at least two purposes: (1) provide customers with greater options with regards to the products or services they can select, and as a result allow them to determine the service level and price that they desire; and (2) allow a product or service provider to more accurately determine the revenue generated by each component of a product or service that they provide to a customer. By permitting a provider to more accurately determine the revenue generated by each component or aspect of a product or service, a subscription based pricing model may enable planning, revenue projections, resource allocation decisions, and other business functions to more accurately reflect the state and needs of a business.

However, the introduction of more flexible (and typically multi-factor) pricing models has also created new problems for businesses. These problems are associated with determining the proper resource utilization accounting, revenue recognition, revenue allocation, pricing configuration, account management, and account status processes. Unfortunately, conventional attempts to address these problems are flawed, with such attempts typically being inefficient and/or ineffective. For example, some conventional approaches to addressing the problems caused by the introduction of subscription based pricing models are insufficiently flexible, difficult to configure, and/or difficult to administer. Further, some conventional approaches fail to clearly communicate account status to customers; for example, some systems may generate account statements that result in a relatively high number of customer queries with respect to amounts owed and/or that are not in accordance with customer expectations with regards to format or the information conveyed.

One problem of particular concern is that of revenue recognition and revenue allocation for revenues generated from subscription based pricing models. This involves properly recognizing revenue and then allocating revenue to the appropriate accounting period and operational aspect of the business. This process may be based on the applicable revenue recognition rules, revenue allocation factors, and the terms of the applicable subscription. However, conventional approaches to addressing the problems introduced by subscription based charges for products or services have not proven to be effective or practical for a business that is operating within a subscription based economy. This is at least partially the result of certain of the complexities of a subscription based pricing model, which may include one or more of monetizing a sale over time instead of as a single event, customer initiated amendments to a subscription or to its terms (e.g., changing to a different rate plan or service consumption rate, adding new features or services, changing to the billing period, etc.), the applicable revenue recognition rules and changes to those rules, etc.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

Figure 1:
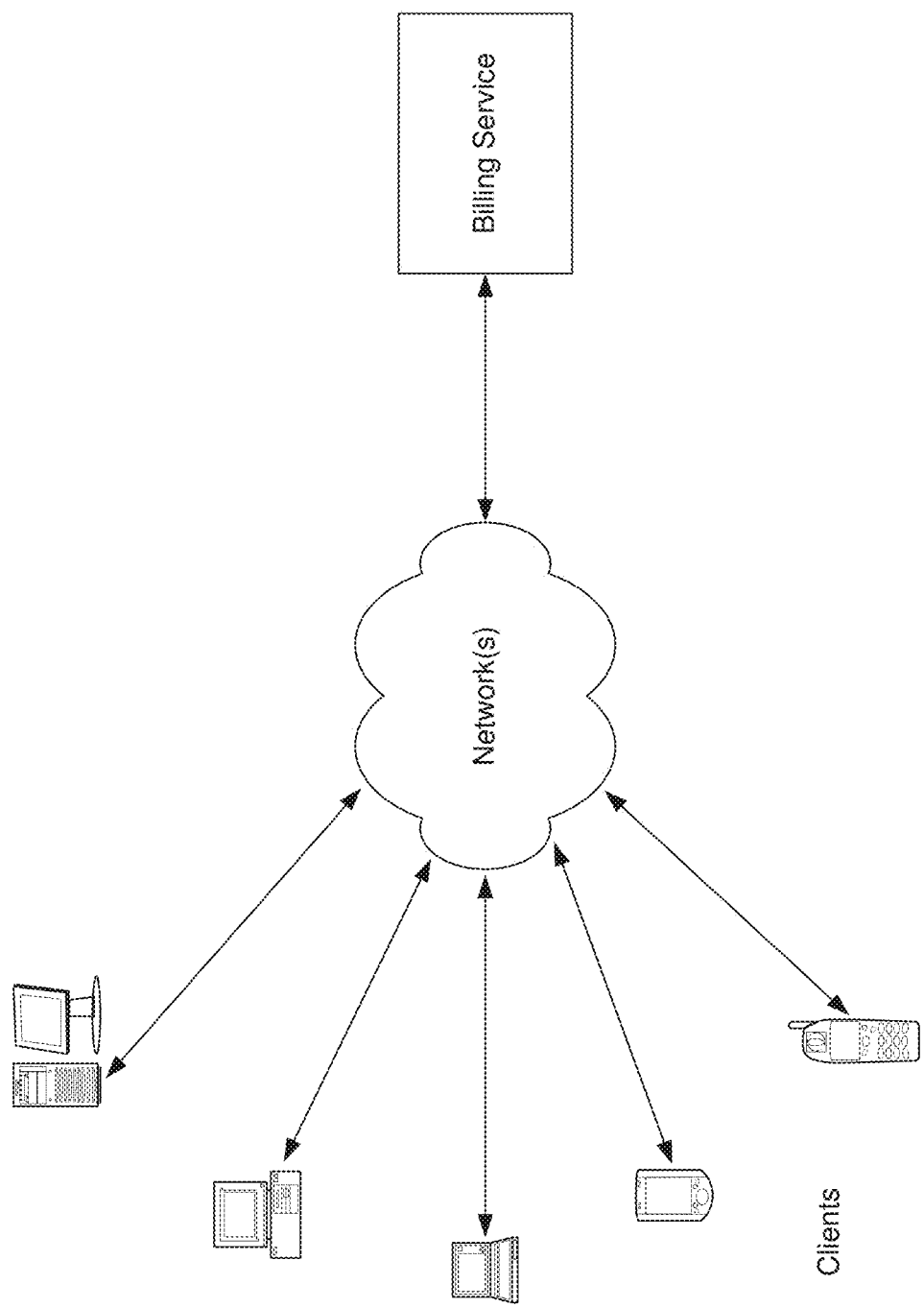
FIG. 1 is a diagram illustrating aspects of an example operating environment in which an embodiment of the subject matter disclosed herein may be implemented.

The subject matter of embodiments of the present disclosure is described here with specificity to meet statutory requirements, but this description is not necessarily intended to limit the scope of the claims. The claimed subject matter may be embodied in other ways, may include different elements or steps, a different order of steps, and may be used in conjunction with other existing or future technologies. This description should not be interpreted as implying any particular order or arrangement among or between various steps or elements except when the order of individual steps or arrangement of elements is explicitly described.

The accompanying drawings, which form a part hereof, and which show, by way of illustration, exemplary embodiments by which the various systems and methods may be practiced. This systems and methods may, however, be embodied in many different forms and should not be construed as limited to the embodiments set forth herein; rather, these embodiments are provided so that this disclosure will satisfy the statutory requirements and convey the scope to those skilled in the art.

Among other things, the present embodiments may be embodied in whole or in part as a system, as one or more methods, or as one or more devices. Embodiments may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, and the like, that is part of a server, client or other computing or data processing device or system) that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

As alluded to above, one problem of particular concern is that of revenue recognition and revenue allocation for revenues generated from subscription based pricing models. This involves properly recognizing revenue and then allocating revenue to the appropriate accounting period and operational aspect of the business. This process may be based on the applicable revenue recognition rules, revenue allocation factors, and the terms of the applicable subscription. However, conventional approaches to addressing the problems introduced by subscription based charges for products or services have not proven to be effective or practical for a business that is operating within a subscription based economy. This is at least partially the result of certain of the complexities of a subscription based pricing model, which may include one or more of monetizing a sale over time instead of as a single event, customer initiated amendments to a subscription or to its terms (e.g., changing to a different rate plan or service consumption rate, adding new features or services, changing to the billing period, and the like), the applicable revenue recognition rules and changes to those rules. These problems are addressed in the various system and method embodiments disclosed herein.

By way of overview, embodiments are directed to systems, apparatuses, and methods for the recognition and allocation of revenue generated by a subscription based pricing model or plan that is applied to a product or service. Various embodiments may respond to customer needs for a flexible and powerful revenue allocation engine to permit correct revenue distribution within a subscription economy and effectively trace changes to a revenue schedule and the resulting revenue recognition. Embodiments can efficiently react to changes to a subscription agreement and calculate a new distribution for a revenue schedule and its impact on revenue recognition and future revenue projections. In one embodiment, a computing system includes a revenue recognition/allocation engine that operates to evaluate the impact of "charge events" on revenue generation, taking into account relevant business rules and revenue recognition principles.

In accordance with at least one embodiment, an efficient, effective, and flexible system and method of cost accounting and billing is provided. Products and services (collectively referenced herein as "products") may be specified, for example, with a web-based user interface, and associated with charges including one-time charges, recurring charges, and usage charges. In accordance with at least one embodiment, such specification is flexible enough to support a wide variety of product subscription options, including time-based products such as telecommunication network use, provision of and access to remote computing resources, and content delivery products having a charge amount based on one or more characteristics of the content and/or timing of delivery (e.g., a charge upon release or a charge after an elapsed interval of time). A customer account may be maintained and associated with a subscription or subscriptions referencing one or more products or services. Subscriptions may be amended over time, and a history of such amendments may be maintained. Charge segments, reflecting charges incurred by customer accounts due to charge events and aligned to suitable time intervals (such as time intervals associated with time boundaries, e.g., beginnings and endings of days, weeks, months, quarters, calendar years, financial years), may be generated in accordance with the terms or conditions of a subscription.

In accordance with at least one embodiment, flexibility in specifying charges for different "events", collecting charges as part of determining a cost to a customer, and generating charge segments and charge events contributes to an ability to support a wide variety of product subscription options (and hence product and service offerings). Examples of such flexible charge specification include charges specified in accordance with a commit charge model and/or charges specified in accordance with a discount model. With respect to charges specified in accordance with a commit charge model, charges may be associated with a committed amount of resources per year (e.g., 1200 units per year). Resource utilization may be determined and/or measured regularly (e.g., monthly). If aggregate usage exceeds the committed amount, an overage charge event may be generated. An optional smoothing may be applied with respect to aggregate usage determination. For example, aggregate resource utilization may be determined with respect to a "rolling window" of time with respect to a current measurement and/or billing period. Overage charge events may be applied at a configurable time with respect to factors such as the actual occurrence of the overage, and/or a current measurement, and/or an applicable billing period.

Example discount models for charge specification include a fixed amount discount model and a percentage discount model. Discounts may be applied at product, subscription, and/or account levels. Discounts may be one-time, recurring, and/or apply for a limited period of time. Discounts may be reversible, for example, discounts may be conditional upon terms specified by a contract. Discounts may be configured to apply only to "positive" statement and/or account balances. Alternatively, or in addition, "negative" account balances may be "rolled over" between statement periods. Discounts may be conditionally applied to all charges or to charges of a particular type. Taxes may be determined at a time with respect to the application of discounts (e.g., after the application of discounts). A determined discount amount may be capped with respect to various time intervals (e.g., a statement period) or usage factors, and discounts may be conditioned on the presence or absence of other discounts or factors. These and other aspects are described below with respect to descriptions corresponding to FIGS. 1-5.

FIG. 1 is a diagram illustrating aspects of an example operating environment 100 in which various embodiments may be implemented. A variety of clients incorporating and/or incorporated into a variety of computing devices may communicate with a billing service 130 through one or more networks 120. For example, a client may incorporate and/or be incorporated into a client application implemented at least in part by one or more of the computing devices. Examples of suitable computing devices include personal computers 101, server computers 102, desktop computers, laptop computers 103, notebook computers, personal digital assistants (PDAs) 104, smart phones 105, cell phones, computers, and consumer electronics incorporating one or more computing device components such as one or more processors. Examples of suitable networks include networks including wired and wireless communication technologies and networks operating in accordance with any suitable networking and/or communication protocol.

Figure 2:
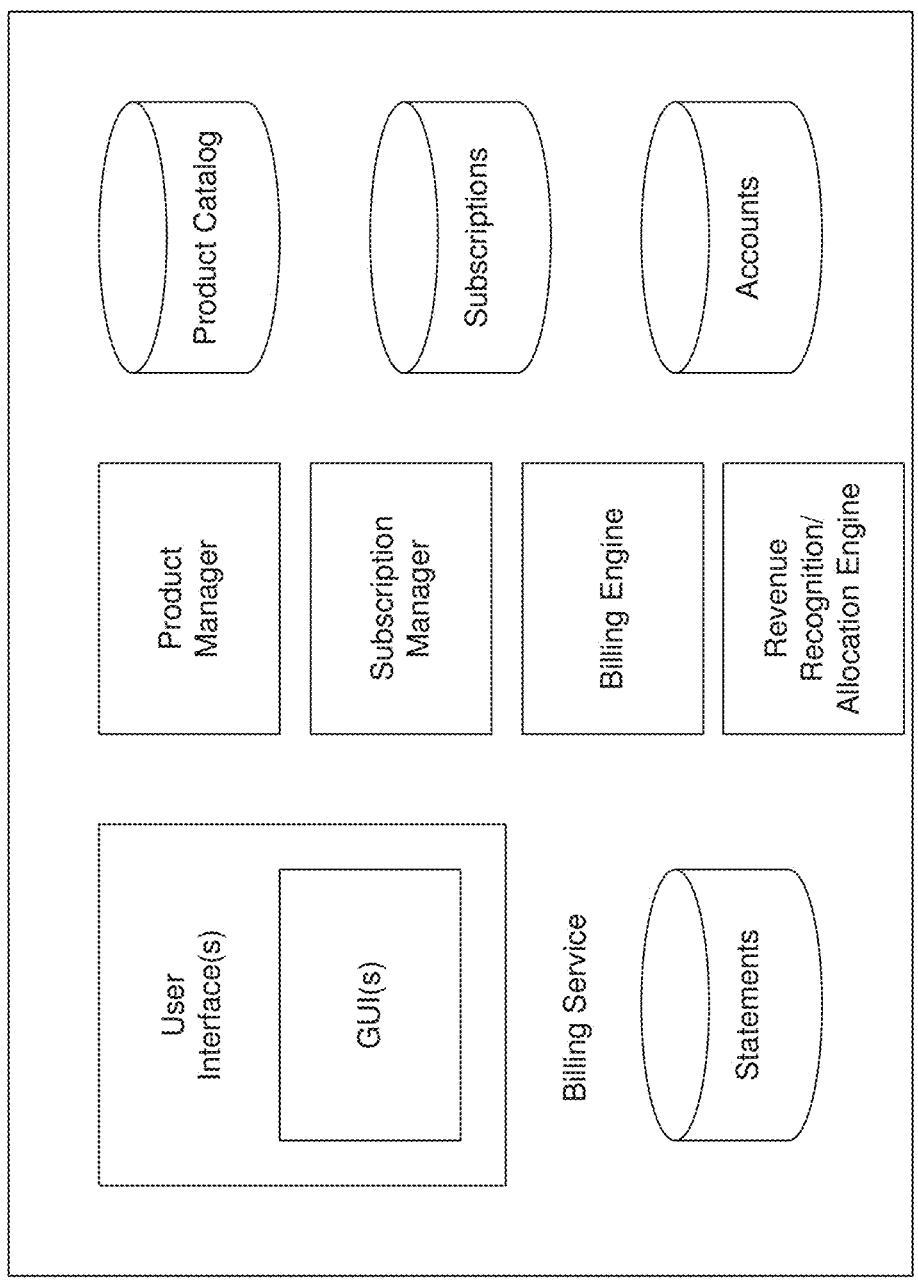
FIG. 2 is a diagram illustrating aspects of an example billing service that includes a revenue recognition/allocation engine, in accordance with an embodiment of the subject matter disclosed herein.

FIG. 2 is a diagram illustrating aspects of an example billing service 120 that includes a revenue recognition/allocation engine 216 ("allocation engine" 216 hereinafter), in accordance with an embodiment. The billing service 120 may include one or more user interfaces, including one or more programmatic interfaces 202 and/or one or more graphical user interfaces (GUIs) 204, configured at least to enable access to functionality of the billing service 120. The billing service 120 may include a product manager component 210 configured at least to enable establishment and maintenance of product and service specifications 222 including associated rate plans and charges. The billing service 120 may include a subscription manager component 212 configured at least to enable establishment and maintenance of customer accounts 226 and associated product subscriptions 224. The billing service 120 may further include a billing engine component 214 configured at least to periodically generate charge events in accordance with active subscriptions 224. The billing engine 214 may be further configured to generate account statements 220 based at least in part on the generated charge events. Such account statements may be presented in variety of formats including a printed format and an electronic format, for example, accessible by customers through a graphical user interface 204 of the billing service 120. FIG. 2 also depicts an embodiment of an allocation engine 216 that may be implemented as a module that interacts with the components of a billing service 120. The allocation engine further include a distribution engine 218 for implementing various allocations determined by the allocation engine 216 Note that although depicted as part of a multi-component billing service 120, various embodiments of the allocation Engine 216 may also be implemented as a component or element that is separate from a billing service 120. The module and computing Elements as discussed in FIG. 2 may be utilized in conjunction with a data model for revenue allocation and recognition as discussed next with respect to FIG. 3.

Figure 3:
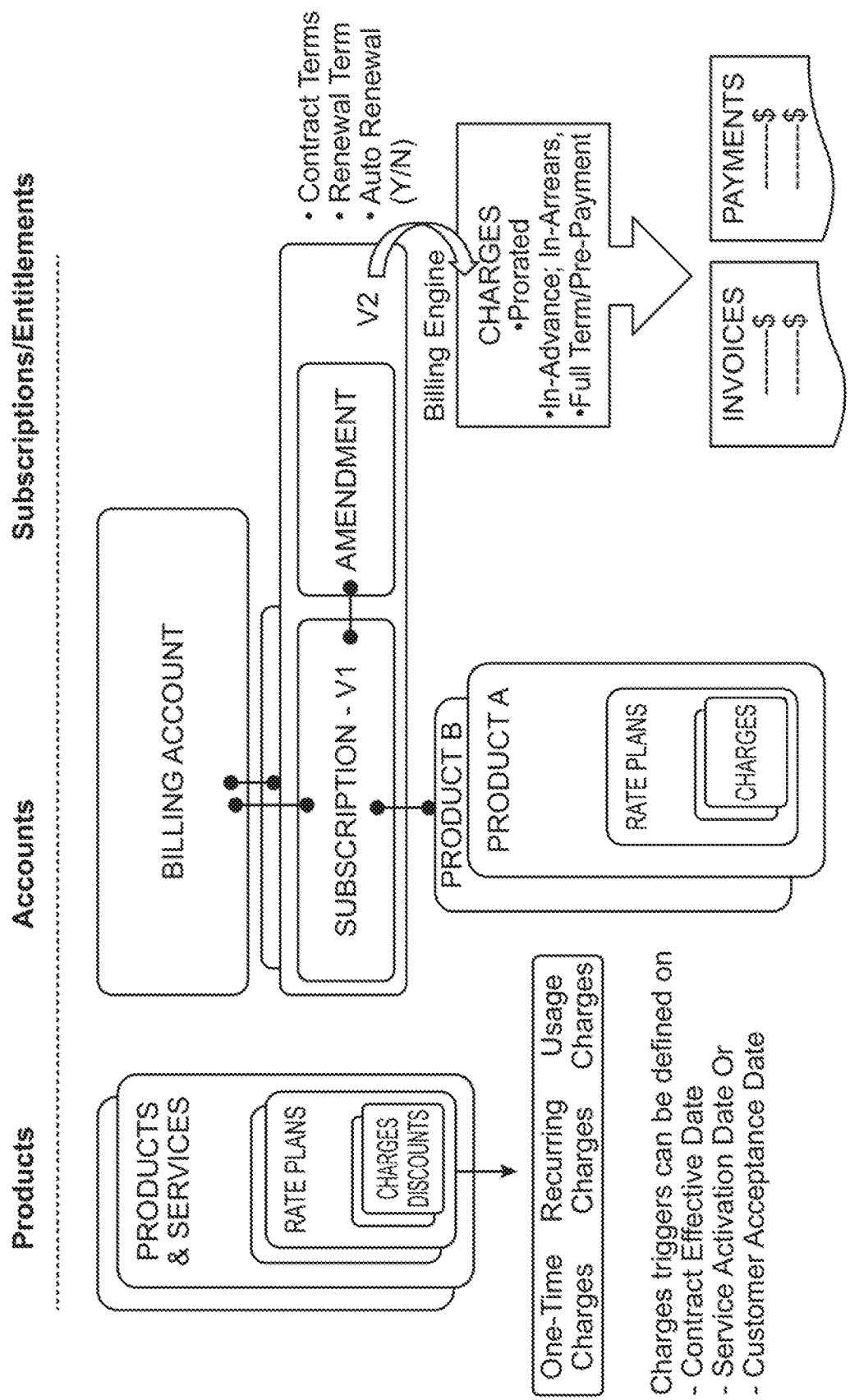
FIG. 3 is a diagram illustrating aspects of an example data model that may be used in implementing an embodiment of the subject matter disclosed herein.

FIG. 3 is a diagram illustrating aspects of an example data model that may be used in implementing an embodiment of the subject matter disclosed herein. The allocation engine 216 (FIG. 2) may manage billing data in accordance with this data model. Generally speaking, the data in the data model may be considered one of products 301, accounts 302, or subscriptions/entitlements 303. These data distinctions are generally shown in FIG. 3 as three columns. Although presented in FIG. 3 in this manner, there is no restriction on how data may be used. This depiction is simply done so to ease understanding of the data model underlying the revenue allocation systems and methods.

Turning to the first data column grouping of products 222, all products and services 310 offered by an enterprise may be associated with products 222 in this data model. Further, each product or service may include one or more rate plans 311. Further yet, each corresponding rate plan may be associated with one or more charges 312. Such charge may include one-time charges, recurring charges, usage charges, and discounts. Charges 312 may be triggered by events such as a contract becoming effective and a product or service becoming active.

In a second data column grouping of accounts 226, billing accounts associated with customers may be presented. Each billing account 320 may have an identification of subscriptions 321 and, as first pass, all subscriptions have a first (initial) version. Each subscription 321 is then further associated in the billing account 320 with a product or service 322, a rate plan 323 and charges to date 324.

In a third data column grouping of subscriptions/entitlements 224, amendments 330 to subscriptions, invoices 333 and payments 334 may be reflected. Thus, as changes are made to various existing subscriptions, subsequent versions of the subscriptions may be stored with respect to a billing account 320. In this example data model, a second version 331 of the subscription is shown after an amendment 330. As amendments are implemented, charge amendments 332 may be generated that alter the previous manner in which receipts are allocated. These charge amendments 332 may also be reflected in future invoice 333 and future payments 334.

These groupings of data in the data model of FIG. 3 allow for a customer or billing account 320 to be associated with one or more subscriptions 321 to products and services 310. A subscription may be associated with one or more of the specified products 310 and a selected rate plan 311 for each of the products. Subscriptions may typically have a start date and an end date. In other embodiments, subscriptions may be referred to as "evergreen" and therefore, need not have an end date. Subscriptions 321 may be amended, for example, to update the end date, to modify the set of associated products, and/or to modify the selected rate plans associated with the set of associated products. Subscriptions may be associated with a set of contract terms and conditions, and subscription amendments may correspond to contract amendments.

Billing accounts 320 may have a hierarchical structure. For example, some accounts may be "parent" accounts with respect to "child" accounts. Subscriptions 321 may be associated with parent accounts and/or child accounts. Account statements and/or invoices may be generated with respect to parent accounts and/or child accounts. Service and/or resource utilization may be associated with child accounts and reported (including aggregated and/or summarized) at a parent account level.

A data model used with an embodiment may enable efficient and effective presentation of incurred charges in accordance with customer expectations. As described, such a data model may be subscription-based and include flexible charge objects, for example, capable of representing overage charges and discounts. Such a data model may further facilitate efficient and effective determination of financial metrics, such as monthly recurring revenue (MRR), total contract value (TCV), total invoice amount, and annual contract value. For example, such metrics may be determined based on charge segments, and "rolled up" to the charge, subscription and/or amendment, and account levels. Reliable determination of such metrics is not insignificant, since product vendor business decisions can depend on the resultant values.

In the context of this data model, the billing engine 214 of the billing service may generate charge events that each have one or more corresponding charge objects in accordance with charges and charge segments associated with subscriptions. As used herein, unless clearly contradicted by context, the terms "charge" and "charge segment" refer to charge objects that provide information for generating "charge events." Charge objects need not be associated with particular dates, whereas, in accordance with at least one embodiment, charge segments are associated with time intervals. For example, multiple charge segments may be created with respect to a single recurring charge object, for example, in response to a price and/or quantity change in an associated charge object at certain time. The billing engine 214 may appropriately pro-rate charges when generating charge events based on associated charge segment information in the context of a service, statement and/or billing period (collectively "billing period").

Charge segments may correspond to sub-elements of a charge object that can track changes to a charge over a series of time intervals. For each charge segment, the billing engine 214 may generate one or more charge events that are applied to an account and/or appear on an invoice. For example, suppose that a monthly charge is effective from Jan. 1, 2015 to Dec. 15, 20311 with an initial price of $100. Then, on Mar. 1, 2015, the price is changed to $200. The billing service may model this charge with two charge segments:

(1) Charge segment 1 with attributes: effective from Jan. 1, 20151 to Feb. 28, 2015, price $100, quantity 1; and
(2) Charge segment 2 with attributes: effective from Mar. 1, 2015 to Dec. 31, 2015, price $200, quantity 1.

When the billing engine 214 processes these charge segments with a bill through date of Apr. 30, 2015, it produces the following charge events based on the charge segment data and the billing period of 1 month:

(1) Charge event 1 with attributes: fee for Jan. 1, 2015 to Jan. 31, 2015, $100×1=$100;
(2) Charge event 2 with attributes: fee for Feb. 1, 2015 to Feb. 28, 2015, $100×1=$100.
(3) Charge event 3 with attributes: fee for Mar. 1, 2015 to Mar. 31, 2015, $200×1=$200; and
(4) Charge event 4 with attributes: fee for Apr. 1, 2015 to Apr. 30, 2015, $200×1=$200.

Eventually, the billing engine 214 may produce 10 charge events of $200 (March through December) associated with charge segment 2 for this year of billing. In this respect, this entire series of charge events may be associated with one charge objects with multiple attributes.

Example charge object attributes include charge identifier (e.g., a unique identifier with respect to charge objects), charge name, charge description (e.g., a human-readable description), a charge type (e.g., one-time, recurring, usage-based, discount), trigger condition, units of measurement, object creation date, "created by" identifier (e.g., referencing an authorized user of the billing service), last modified timestamp (e.g., time and/or date), and "modified by" identifier. Example charge segment attributes include charge segment identifier (e.g., a unique identifier with respect to charge segments), a reference to a generating charge (and/or a copy of some or all of the generating charge attributes), a quantity of units associated with the charge segment, a cost (e.g., a dollar amount) associated with the charge segment, effective start and end dates and/or times, "processed through" and "charged through" dates and/or times, and indicators as to a charge segment's place in a series of charge segments (e.g., segment number, last segment indicator). Separation of date-associated charge segments from specified charge objects associated with subscriptions allows for additional billing service flexibility.

As part of processing recurring charges, the billing engine 214 may maintain independent "processed through" and "charged through" dates and/or times associated with charge events. Recurring charges may be applied in advance so that there is a need to keep track of starting points and ending points associated with billing engine 214 processing of recurring charges. For example, suppose that a charge event associated with a monthly recurring charge is generated for the period Mar. 1, 2015 through Mar. 15, 2031. Then the "processed through" date for the recurring charge may be set to Mar. 15, 2001 and the "charged through" date may be set to Mar. 31, 2015. When a corresponding charge event for the month of April is generated, the "processed through" and "charged through" dates may be advanced to Apr. 1, 2015 and Apr. 30, 2015, respectively. As will be apparent to one of skill in the art, the differing "charged through" date can have consequences for determining and/or forecasting revenue and other financial statistics and/or metrics.

Figure 4:
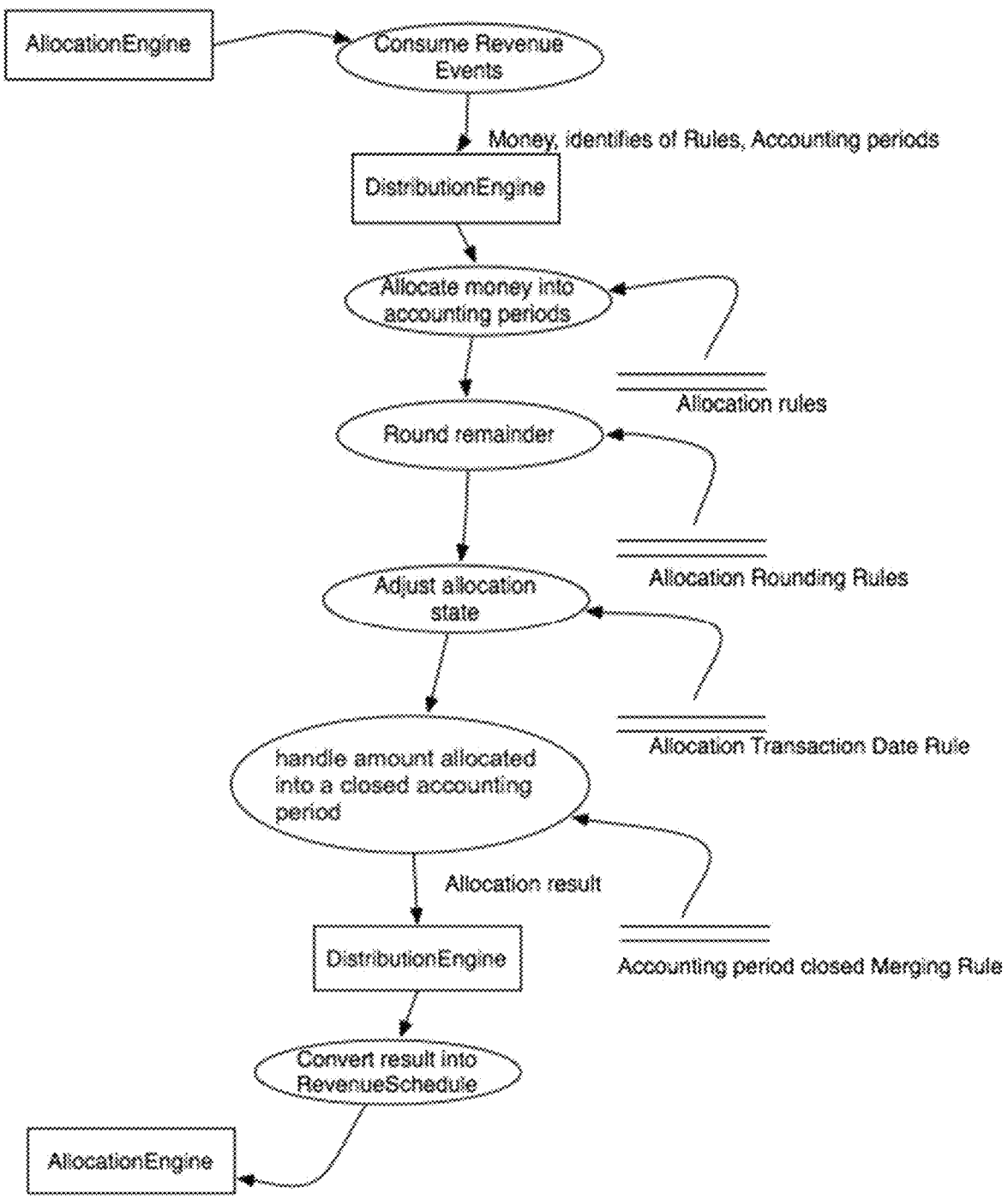
FIG. 4 is a diagram illustrating functional modules and processes that may be implemented as part of an embodiment of the inventive revenue recognition/allocation engine, along with an exemplary data flow between the different modules.

FIG. 4 is a diagram illustrating functional modules and processes that may be implemented as part of an embodiment of the inventive revenue recognition/allocation engine, along with an exemplary data flow between the different modules. Generally speaking, the diagram may be recognized as a computer-based method having steps. The steps may be further construed as being accomplished in the furthest left column by the allocation engine 216 of FIG. 2, the center column by the distribution engine 218 of FIG. 2 and the furthest right column being rules that influence the method steps accomplished by the distribution engine 218.

As alluded to previously, a subscription economy introduces new variables and complexities to the revenue recognition process. For example, traditional revenue recognition ties revenue to a one-time charge event. When the charge event happens, revenue is recognized based on the attribute of the charge event itself. Each charge event is an individual trigger for purposes of revenue recognition, and typically there are no connections or associations between different charge events. Accountants may attempt to use traditional revenue recognition and allocation concepts to handle subscription generated revenue, but this may prove to be inefficient and error prone. As an example, such an attempt may involve many manual and non-standard steps, because a traditional revenue recognition process is not designed with subscription generated revenue in mind, and hence is not compatible with many of the concepts involved in a subscription based economy. Using conventional approaches to revenue recognition and allocation, the revenue generated from each transaction event would be handled independently and grouped together based on certain attributes of the event. This would entail additional steps and may introduce potential errors or questionable judgments into the process.

As noted, in the subscription economy, revenue may be recognized based on one or more of a series of events. A subscription typically includes multiple charges (or possibilities for generating a charge) and each may have a corresponding process for recognizing the associated revenue. A subscription ties to a term, and invoices may be generated and sent periodically. For each subscription, there may be multiple revenue generating events triggered during the term of the subscription, and each instance of revenue generation and the associated revenue recognition may be tied to a service period. The revenue recognition/allocation that results from a subscription may be viewed as the result of multiple potentially overlapping transaction events that occur over an extended period, and may change over time. The overall revenue generation, recognition, and allocation process may be referred to as a revenue schedule.

Of course, revenue recognition is different in a subscription economy. Typically, accounting systems treat each order and invoice as an atomic revenue event (e.g., by establishing a one-time revenue schedule with regular and unchanging revenue recognition events). These revenue events do not change once they start, as each scheduled revenue event is based on the schedule of a one-time event (such as an invoice or order). However, in a subscription economy, the relationship between the provider and the consumer (and thus between the various revenue generating events and how that revenue is allocated/recognized) changes with upsells, down-sells, revisions to the terms of a subscription, and the like. In the embodiment described with respect to FIG. 4, efficient and accurate tracking of revenue generated by such subscription economy based events by examining revenue generating events at the charge level rather than as a single time event.

Turning to the method steps of FIG. 4, the method may start at step 402 when some kind of subscription economy based transaction occurs. At step 403, the allocation engine 216 may recognize an event as revenue event that triggers one or more changes to the manner in which revenue has been schedule to be recognized. Such a change may occur as a result of a revenue amount change or a distribution condition change to a revenue schedule for a transaction. In real-world terms, this change event may originate from a user or device interacting with a user interface corresponding to the transactional order system, a user or device interacting with an application programming interface, a user or device monitoring a data stream, a user or device polling a data source, or a user or device subscribing to a data stream.

In response, the allocation engine may determine the impact and relevant amounts for each accounting period, based on one or more of the relevant revenue recognition rule(s), revenue period, revenue amount, an original revenue schedule distribution state and the like. To do so, the allocation engine utilizes a sub-processing module, the distribution engine 218, to determine the specific event attributes at step 404. In determining the event attributes, the distribution engine utilizes specific event rules 430 established by a system administrator, such as money denomination rules, identification rules, accounting period rules, and the like.

Once specific attributes of the charge object corresponding to the identified revenue event are determined, the distribution engine 218 may now reallocate revenue according to a set of allocation rules 432 at step 406. As the revenue is reallocated, sometimes, the revenue to be allocated is not easily divisible of the accounting periods indicated. Thus, the distribution engine, at step 408 performs a rounding distribution of revenue based on a set of rounding rules 434. Such rounding rules may round to the nearest cent or nearest dollar.

Further, the distribution engine 218 may also reallocate revenue based upon a transaction date of the triggering event at step 410. Such variations may be present if the transaction date is mid-month, for example. As another example, revenue may be readjusted based on the variation in the number of days in various months or years. These transaction date variables are governed by a set of transaction date rules 436. Finally, the distribution engine 218 may alter previous (closed) accounting periods if the transaction warrants (e.g., refund, retroactive discount) at step 412. These types of closed accounting period adjustments may be defined by a set of merging rules 438.

Once the distribution engine assembles all object attributes to be adjusted, changed, removed, or otherwise altered, the distribution engine passes the object back to the allocation engine 216 to convert the resulting altered charge object into revenue scheduling at step 414. After the new revenue schedule is in place, the method of FIG. 4 may end at step 416.

By way of example consider the following representative descriptions and steps for altering revenue recognition when a specific trigger event occurs. Assume that a customer with an existing billing account has the following monthly accounting periods defined, with the indicated status:

| Name | Start Date | End Date | Closed? |
| --- | --- | --- | --- |
| December 2011 | Dec. 1, 2011 | Dec. 31, 2011 | Yes |
| January 2012 | Jan. 1, 2012 | Jan. 31, 2012 | Yes |
| February 2012 | Feb. 1, 2012 | Feb. 29, 2012 | No |
| March 2012 | Mar. 1, 2012 | Mar. 31, 2012 | No |
| April 2012 | Apr. 1, 2012 | Apr. 30, 2012 | No |
| May 2012 | May 1, 2012 | May 31, 2012 | No |
| June 2012 | Jun. 1, 2012 | Jun. 30, 2012 | No |

In this example, an initial transaction may have an amount of $1198.14, and the transaction date is Jan. 15, 2012, with the service period being Dec. 21, 2011~Apr. 21, 2012. This initial transaction may also have existing rules in place: The distribution policy may be set to "Even by Period" in order to allocate revenue evenly for each accounting period; the rounding rule may be set to "round to last few" in order to round the remainder to the last few accounting periods; the transaction date rule may be set to "accumulate to transaction date" in order for the revenue allocated in the accounting period to accumulate in the accounting period the transaction date falls in before transaction date; and the accounting period close rule may be set at "to first open", in order for the revenue allocated in closed accounting period to be moved to the to the first open accounting period.

Applying the set of rules to the allocation and distribution engines to set the stage for a reallocation of revenue generates the following inputs: revenue period is set to the service period Dec. 21, 2011~Apr. 21, 2012; the revenue amount is set to $1198.14 in this case; the accounting periods covered by the date range are December'2011, January'2012, February'2012, March'2012, and April'2012; and the current revenue schedule distribution state is not created yet, Below is the data flow for an embodiment of a system and method using the revenue allocation engine that can be used for this transaction and its primary operations.

Step 406: Use the "even by period" distribution rule, each accounting period was allocated $239.62, and the remainder is $0.04:

| Accounting | Start Date | End Date | Revenue: after distributionWSD) | Remainder(USD) |
|---|---|---|---|---|
| | | | 1,198.10 | 0.04 |
| December 2011 | Dec. 1, 2011 | Dec. 31, 2011 | 239.62 | |
| January 2012 | Jan. 1, 2012 | Jan. 31, 2012 | 239.62 | |
| February 2012 | Feb. 1, 2012 | Feb. 29, 2012 | 239.62 | |
| March 2012 | Mar. 1, 2012 | Mar. 31, 2012 | 239.62 | |
| April 2012 | Apr. 1, 2012 | Apr. 30, 2012 | 239.62 | |

Step 408: Use the "round to last few" rounding rule to round the $0.04 to last few accounting periods, so since April'2012 to January'2012, each accounting period get $0.01:

| Accounting | Start Date | End Date | Apply rounding rule (USD) | Rounding Result(USD) |
|---|---|---|---|---|
| | | | | 1,198.14 |
| December 2011 | Dec. 1, 2011 | Dec. 31, 2011 | 239.62 + 0.00 | 239.62 |
| January 2012 | Jan. 1, 2012 | Jan. 31, 2012 | 239.62 + 0.01 | 239.63 |
| February 2012 | Feb. 1, 2012 | Feb. 29, 2012 | 239.62 + 0.01 | 239.63 |
| March 2012 | Mar. 1, 2012 | Mar. 31, 2012 | 239.62 + 0.01 | 239.63 |
| April 2012 | Apr. 1, 2012 | Apr. 30, 2012 | 239.62 + 0.01 | 239.63 |

Step 410: Use the "accumulate to transaction date" transaction date rule, the transaction date is Jan. 15, 2012, it falls into the accounting period January'2012, so the distribution in the accounting periods before January'2012 will be accumulated into January'2012:

| Accounting | Start Date | End Date | Apply Transaction Date Rule(USD) | Transaction Date Rule Results(USD) |
|---|---|---|---|---|
| | | | 1,198.14 | 1,196.14 |
| December 2011 | Dec. 1, 2011 | Dec. 31, 2011 | 239.62 − 239.62 | 0 |
| January 2012 | Jan. 1, 2012 | Jan. 31, 2012 | 239.62 + 239.62 | 479.25 |
| February 2012 | Feb. 1, 2012 | Feb. 29, 2012 | 239.63 | 239.53 |
| March 2012 | Mar. 1, 2012 | Mar. 31, 2012 | 239.63 | 239.63 |
| April 2012 | Apr. 1, 2012 | Apr. 30, 2012 | 239.63 | 239.63 |

Step 411: Calculating the delta, because this is the first transaction event and there is no original allocation state yet and the default original revenue impact to each accounting period is $0:

| Accounting | Start Date | End Date | Calculate delta change(USD) | Delta to Original state(USD) |
|---|---|---|---|---|
| | | | 1,198.14 | 1,198.14 |
| December 2011 | Dec. 1, 2011 | Dec. 31, 2011 | 0 − 0 | 0 |
| January 2012 | Jan. 1, 2012 | Jan. 31, 2012 | 479.25 − 0 | 479.25 |
| February 2012 | Feb. 1, 2012 | Feb. 29, 2012 | 239.63 − 0 | 239.63 |
| March 2012 | Mar. 1, 2012 | Mar. 31, 2012 | 239.63 − 0 | 239.63 |
| April 2012 | Apr. 1, 2012 | Apr. 30, 2012 | 239.63 − 0 | 239.63 |

Step 412: Apply "merge to first open" to merge the revenue distributed in closed accounting period to the first open accounting period, the $479.25 which distributed in January'2012 will move to February'2012 which is the first open accounting period.

| Accounting | Start Date | End Date | Status | Apply accounting period close rule (USD) | Apply accounting period close rule result (USD) |
|---|---|---|---|---|---|
| | | | SUM: | 1,198.14 | 1,198.14 |
| December 2011 | Dec. 1, 2011 | Dec. 31, 2011 | Closed | 0 | 0 |
| January 2012 | Jan. 1, 2012 | Jan. 31, 2012 | Closed | 479.25 − 479.25 | 0 |
| February 2012 | Feb. 1, 2012 | Feb. 29, 2012 | Open | 239.63 + 479.25 | 718.88 |
| March 2012 | Mar. 1, 2012 | Mar. 31, 2012 | Open | 239.63 | 239.63 |
| April 2012 | Apr. 1, 2012 | Apr. 30, 2012 | Open | 239.63 | 239.63 |

Step 414: As a result of applying the applicable rules or conditions, the final distribution results obtained from the inventive Revenue Allocation Engine is:

| Accounting | Start Date | End Date | Status | Revenue | Currency |
|---|---|---|---|---|---|
| | | | SUM: | 1,198.14 | USD |
| December 2011 | Dec. 1, 2011 | Dec. 31, 2011 | Closed | 0 | USD |
| January 2012 | Jan. 1, 2012 | Jan. 31, 2012 | Closed | 0 | USD |
| February 2012 | Feb. 1, 2012 | Feb. 29, 2012 | Open | 718.88 | USD |
| March 2012 | Mar. 1, 2012 | Mar. 31, 2012 | Open | 239.63 | USD |
| April 2012 | Apr. 1, 2012 | Apr. 30, 2012 | Open | 239.63 | USD |

Figure 5A:
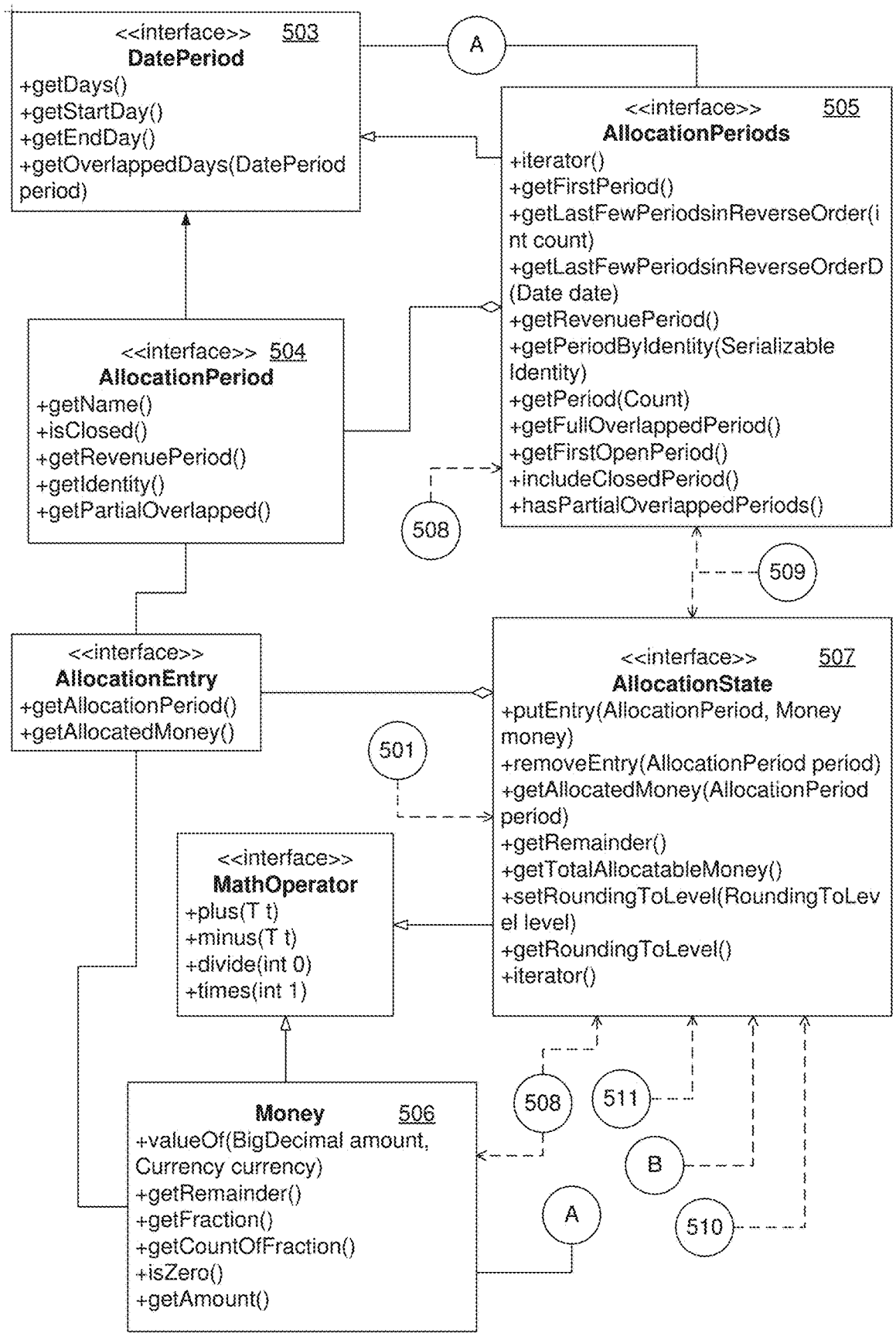
FIGS. 5A-C are diagrams illustrating an "object" definition that may be used in implementing an embodiment of the inventive revenue recognition/allocation engine.
Figure 5B:
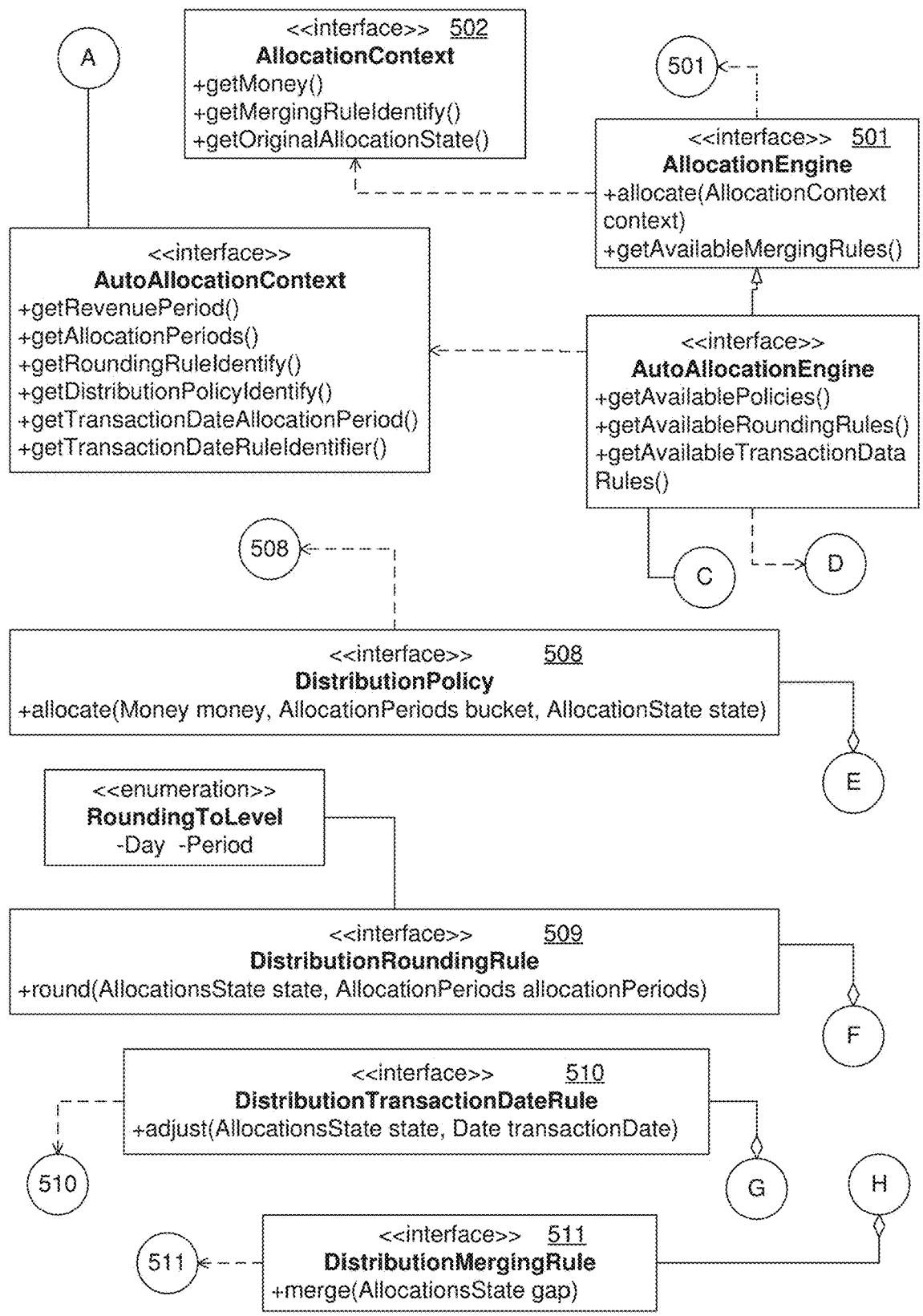
Figure 5C:
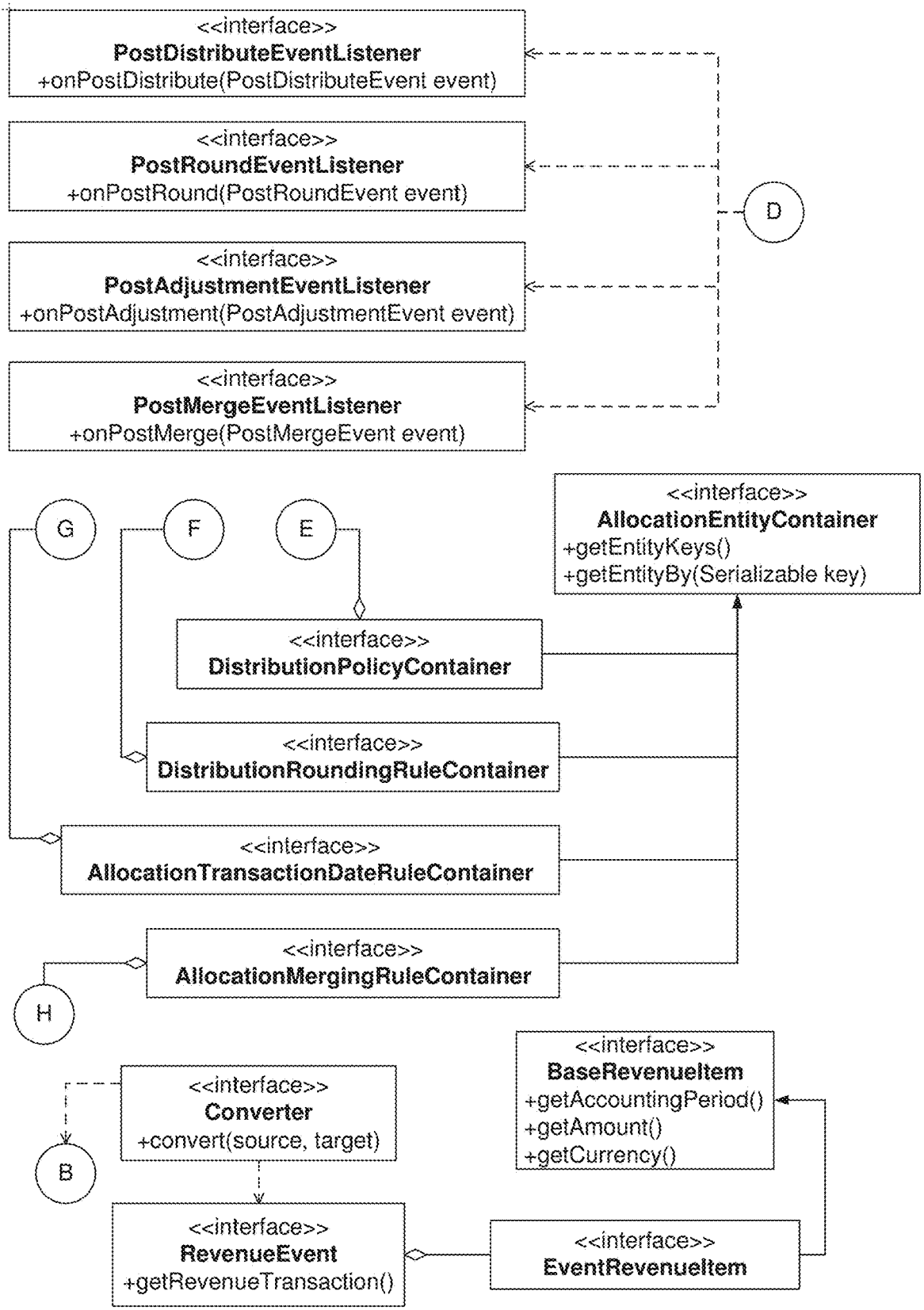

FIGS. 5A-C are diagrams illustrating an object definition that may be used in implementing an embodiment of the revenue allocation engine. The various attributes are shown in this diagram for an object class "AllocationEngine" 501 that is manipulated when a trigger event occurs as described above. The attributes include the following:

AllocationEngine.allocate(AllocationContext context) 502—This is the entry point of the allocation engine, and the input is the AllocationContext which takes the Revenue Amount, Revenue Period, Revenue Recognition rule and others as input and the output is the distribution result.

DatePeriod 503—DatePeriod defines the start and end day, total number of days, and total number of overlap days with another DatePeriod.

AllocationPeriod 504—AllocationPeriod is a DatePeriod and it is the delegate of accounting period inside AllocationEngine; it has values name,isClosed.

AllocationPeriods 505—AllocationPeriods is the container of AllocationPeriod, it define number of periods, how many full overlapped periods with the Revenue Period and the like.

Money 506—Money supports the math operation for money base on the currency, and receives remainder.

AllocationState 507—AllocationState is a container for maintaining and passing temporary allocation results between steps, it also supports math operations between AllocationState data transfers to determine the delta change DistributionPolicy 508—Distribution Policy is an interface of the overall distribution policy. The allocation engine allows extending to one and more distribution policies. Five such example policies are "straight-line, by exact days," "daily on partial and even for full," "straight-line, even by period," "straight-line, prorate first & last period (period-rate)," and "straight-line, for even full period, by total exact days for the partial period and divide the count of partial periods."

DistributionRoundingRule 509—DistributionRoundingRule is an interface for rounding rules. The allocation engine allows extending to one and more rounding rules including at least the rounding rules of "Round to last one," and "Rround to last few."

DistributionTransactionDateRule 510—DistributionTransactionDateRule is an interface for transaction date rule. The allocation engine allows extending to one or more rules including "Accumulate revenue before transaction date to transaction date," and "Recognize revenue without any impact from transaction date."

DistributionMergingRule 511—DistributionMergingRule is an interface for accounting period close rule. The allocation engine allows extending to one or more rules including "Merge to the first open period."

Figure 6:
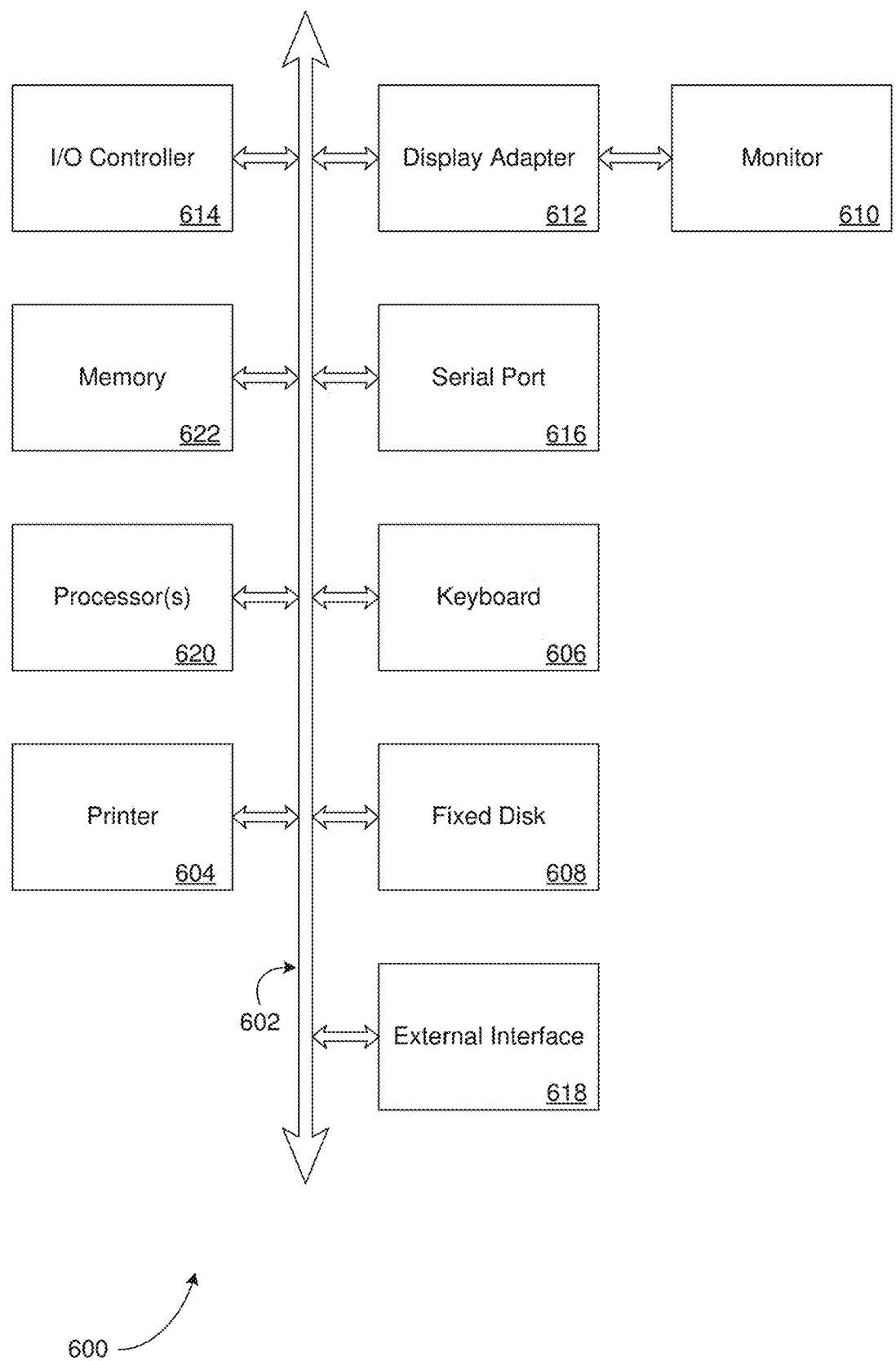
FIG. 6 is a diagram illustrating aspects of an example computing system or device that may be used in implementing an embodiment of the subject matter disclosed herein.

FIG. 6 is a diagram illustrating aspects of an example computing system or device that may be used in implementing an embodiment of the subject matter disclosed herein. In accordance with at least some embodiments, the system, apparatus, device, elements, components, methods, functions, processes, and/or operations for revenue recognition and allocation as part of a subscription economy may be wholly or partially implemented in the form of a set of instructions executed by one or more programmed computer processors, such as a central processing unit (CPU) or microprocessor. Such processors may be incorporated in an apparatus, server, device, client or other computing device operated by, or in communication with, other components of the system. As an example, FIG. 6 is a diagram illustrating aspects of an example computing system or device 600 that may be used in implementing an embodiment. The subsystems shown in FIG. 6 are interconnected via a system bus 602. Additional subsystems may include a printer 604, a keyboard 606, a fixed disk 608, and a monitor 610, which is coupled to a display adapter 612. Peripherals and input/output (I/O) devices, which couple to an I/O controller 614, may be connected to the computer system by any number of means known in the art, such as a serial port 616. For example, the serial port 616 or an external interface 618 may be utilized to connect the computer system/device 600 to further devices and/or systems not shown in FIG. 6, including a wide area network such as the Internet, a mouse input device, and/or a scanner. The interconnection via the system bus 602 allows one or more processors 620 (such as a microprocessor, CPU, controller, and the like) to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the subject matter as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the disclosure and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications can be made without departing from the scope of the claims below.

What is claimed is:

1. A server system operated by a first entity, the server system comprising:
a non-transitory computer readable medium storing instructions and shared code objects for generating merchant-specific objects to recognize and allocate recurring revenue generated from a plurality of subscription-based products offered by a plurality of merchant systems to a plurality of sets of end users; and
at least one electronic processor configured to access the non-transitory computer readable medium and to execute the instructions, the instructions when executed by the at least one electronic processor causing the server system to implement the steps of:
providing a first interface to a first merchant system of the plurality of merchant systems, the first merchant system being remote from the server system and operated by a first merchant different than the first entity, the first interface providing the first merchant system with access to the shared code objects to define:
a first subscription-based object for a first set of services to be offered by the first merchant system to a first subset of a first set of end users, the first interface configured to enable the first merchant system to use the shared code objects to define first subscription data corresponding to a first subscription-based product of the plurality of subscription-based products, the first subscription data including first subscription terms of the first subscription-based product, the first subscription terms including one or more first performance metrics, one or more first revenue recognition rules, and one or more first revenue allocation rules, the one or more first revenue recognition rules defining recognition of first recurring revenue based on one or more occurrences of a first set of recognition events associated with the first set of services, the one or more first revenue allocation rules defining allocation of a respective share of the first recurring revenue to a first respective time period associated with the first set of services; and
a second subscription-based object for a second set of services to be offered by the first merchant system to a second subset of the first set of end users, the first set of services being different than the second set of services, the first interface configured to enable the first merchant system to use the shared code objects to define second subscription data corresponding to a second subscription-based product of the plurality of subscription-based products, the second subscription data including second subscription terms of the second subscription-based product, the second subscription terms including one or more second performance metrics, one or more second revenue recognition rules, and one or more second revenue allocation rules, the one or more second revenue recognition rules defining recognition of second recurring revenue based on one or more occurrences of a second set of recognition events associated with the second set of services, the one or more second revenue allocation rules defining allocation of a respective share of the second recurring revenue to a second respective time period associated with the second set of services;

providing a second interface configured to enable the first merchant system to create a first plurality of user accounts associated with the first subscription-based object for the first subset of the first set of end users and a second plurality of user accounts associated with the second subscription-based object for the second subset of the first set of end users, each user account of the first plurality and the second plurality having a respective set of first account details, the first account details including first subscription-based product identification information, one or more first cost attributes and one or more first calendaring attributes;

providing a third interface to a second merchant system of the plurality of merchant systems, the second merchant system being remote from the server system and remote from the first merchant system and operated by a second merchant different than the first entity and different than the first merchant, the second interface providing the second merchant system with access to the shared code objects to define:

a third subscription-based object for a third set of services to be offered by the second merchant system to a third subset of a second set of end users, the third interface configured to enable the second merchant system to use the shared code objects to define third subscription data corresponding to a third subscription-based product of the plurality of subscription-based products, the third subscription data including third subscription terms of the third subscription-based product, the third subscription terms including one or more third performance metrics, one or more third revenue recognition rules, and one or more third revenue allocation rules, the one or more third revenue recognition rules defining recognition of third recurring revenue based on one or more occurrences of a third set of recognition events associated with the third set of services, the one or more third revenue allocation rules defining allocation of a respective share of the third recurring revenue to a third respective time period associated with the third set of services; and a fourth subscription-based object for a fourth set of services to be offered by the second merchant system to a fourth subset of the second set of end users, the third set of services being different than the fourth set of services, the third interface configured to enable the second merchant system to use the shared code objects to define fourth subscription data corresponding to a fourth subscription-based product of the plurality of subscription-based products, the fourth subscription data including fourth subscription terms of the fourth subscription-based product, the fourth subscription terms including one or more fourth performance metrics, one or more fourth revenue recognition rules, and one or more fourth revenue allocation rules, the one or more fourth revenue recognition rules defining recognition of fourth recurring revenue based on one or more occurrences of a fourth set of recognition events associated with the fourth set of services, the one or more fourth revenue allocation rules defining allocation of a respective share of the fourth recurring revenue to a fourth respective time period associated with the fourth set of services; and providing a fourth interface configured to enable the second merchant system to create a third plurality of user accounts associated with the third subscription-based object for the third subset of the second set of end users and a fourth plurality of user accounts associated with the fourth subscription-based object for the fourth subset of the second set of end users, each user account of the third plurality and the fourth plurality having a respective set of second account details, the second account details including second subscription-based product identification information, one or more second cost attributes and one or more second calendaring attributes;

each of the first subscription-based object, the second subscription-based object, the third subscription-based object, and the fourth subscription-based object being configured to perform:

documenting respective recurring funds received from respective end users of the plurality of sets of end users;

identifying one or more occurrences of respective recognition events and, based on the identifying of the one or more occurrences of the respective recognition events, using respective revenue recognition rules to trigger and document revenue recognition of respective shares of the respective recurring funds; and using respective revenue allocation rules to allocate the respective shares of the respective recurring funds to respective time periods.

2. The server system of claim 1, wherein the one or more first revenue recognition rules comprise a trigger condition defining a manner in which recurring revenue is recognized.

3. The server system of claim 1, wherein the one or more first revenue recognition rules comprise a length of time attribute defining a duration in which a subscription remains valid.

4. The server system of claim 1, wherein the one or more first revenue recognition rules comprise a start date attribute defining a date on which a subscription becomes valid.

5. The server system of claim 1, wherein the one or more first revenue recognition rules comprise a rule defining a manner in which recurring revenue is recognized in accounting procedures.

6. The server system of claim 1, wherein the one or more first revenue allocation rules comprise a rounding rule defining a manner in which recurring revenue is divided into different accounting periods.

7. The server system of claim 1, wherein the one or more first revenue allocation rules comprise a transaction date rule defining a manner in which recurring revenue that is recognized in accounting procedures is allocated with respect to a date associated with an accounting period.

8. The server system of claim 1, wherein the one or more first revenue recognition rules comprise a merging rule defining a manner in which recurring revenue that should be recognized as revenue in a first accounting period that is closed in accounting procedures is recognized in a different accounting period that is not closed.

9. The server system of claim 8, wherein the instructions when executed by the at least electronic processor further cause the apparatus to determine a difference in previously recognized revenue and reallocate recognized revenue for each accounting period in a plurality of accounting periods associated with a subscription.

10. The server system of claim 1, further comprising:
a products manager module configured to maintain records of products;
a subscription manager module configured to maintain records of subscriptions; and
a billing engine module configured to generate billing events for products in the subscriptions.

11. A computer-based method executing in a revenue recognition system, the method comprising:
providing a first interface to a first merchant system of a plurality of merchant systems, the first merchant system being remote from the server system and operated by a first merchant different than the first entity, the first interface providing the first merchant system with access to shared code objects, the shared code objects configured to assist in generating merchant-specific objects to recognize and allocate revenue generated from a plurality of subscription-based products offered by a plurality of merchant systems to a plurality of sets of end users, the providing the first interface to access the shared code objects to define:
a first subscription-based object for a first set of services to be offered by the first merchant system to a first subset of a first set of end users, the first interface configured to enable the first merchant system to use the shared code objects to define first subscription data corresponding to a first subscription-based product of the plurality of subscription-based products, the first subscription data including first subscription terms of the first subscription-based product, the first subscription terms including one or more first performance metrics, one or more first revenue recognition rules, and one or more first revenue allocation rules, the one or more first revenue recognition rules defining recognition of first recurring revenue based on one or more occurrences of a first set of recognition events associated with the first set of services, the one or more first revenue allocation rules defining allocation of a respective share of the first recurring revenue to a first respective time period associated with the first set of services; and
a second subscription-based object for a second set of services to be offered by the first merchant system to a second subset of the first set of end users, the first set of services being different than the second set of services, the first interface configured to enable the first merchant system to use the shared code objects to define second subscription data corresponding to a second subscription-based product of the plurality of subscription-based products, the second subscription data including second subscription terms of the second subscription-based product, the second subscription terms including one or more second performance metrics, one or more second revenue recognition rules, and one or more second revenue allocation rules, the one or more second revenue recognition rules defining recognition of second recurring revenue based on one or more occurrences of a second set of recognition events associated with the second set of services, the one or more second revenue allocation rules defining allocation of a respective share of the second recurring revenue to a second respective time period associated with the second set of services;
providing a second interface configured to enable the first merchant system to create a first plurality of user accounts associated with the first subscription-based object for the first subset of the first set of end users and a second plurality of user accounts associated with the second subscription-based object for the second subset of the first set of end users, each user account of the first plurality and the second plurality having a respective set of first account details, the first account details including first subscription-based product identification information, one or more first cost attributes and one or more first calendaring attributes;
providing a third interface to a second merchant system of the plurality of merchant systems, the second merchant system being remote from the server system and remote from the first merchant system and operated by a second merchant different than the first entity and different than the first merchant, the second interface providing the second merchant system with access to the shared code objects to define:
a third subscription-based object for a third set of services to be offered by the second merchant system to a third subset of a second set of end users, the third interface configured to enable the second merchant system to use the shared code objects to define third subscription data corresponding to a third subscription-based product of the plurality of subscription-based products, the third subscription data including third subscription terms of the third subscription-based product, the third subscription terms including one or more third performance metrics, one or more third revenue recognition rules, and one or more third revenue allocation rules, the one or more third revenue recognition rules defining recognition of third recurring revenue based on one or more occurrences of a third set of recognition events associated with the third set of services, the one or more third revenue allocation rules defining allocation of a respective share of the third recurring revenue to a third respective time period associated with the third set of services; and
a fourth subscription-based object for a fourth set of services to be offered by the second merchant system to a fourth subset of the second set of end users, the third set of services being different than the fourth set of services, the third interface configured to enable the second merchant system to use the shared code objects to define fourth subscription data corresponding to a fourth subscription-based product of the plurality of subscription-based products, the fourth subscription data including fourth subscription terms of the fourth subscription-based product, the fourth subscription terms including one or more fourth performance metrics, one or more fourth revenue recognition rules, and one or more fourth revenue allocation rules, the one or more fourth revenue recognition rules defining recognition of fourth recurring revenue based on one or more occurrences of a fourth set of recognition events associated with the fourth set of services, the one or more fourth revenue allocation rules defining allocation of a respective share of the fourth recurring revenue to a fourth respective time period associated with the fourth set of services; and
providing a fourth interface configured to enable the second merchant system to create a third plurality of user accounts associated with the third subscription-based object for the third subset of the second set of end users and a fourth plurality of user accounts associated with the fourth subscription-based object for the fourth subset of the second set of end users, each user account of the third plurality and the fourth plurality having a respective set of second account details, the second account details including second subscription-based product identification information, one or more second cost attributes and one or more second calendaring attributes;

each of the first subscription-based object, the second subscription-based object, the third subscription-based object, and the fourth subscription-based object being configured to perform:

documenting respective recurring funds received from respective end users of the plurality of sets of end users;

identifying one or more occurrences of respective recognition events and, based on the identifying of the one or more occurrences of the respective recognition events, using respective revenue recognition rules to trigger and document revenue recognition of respective shares of the respective recurring funds; and using respective revenue allocation rules to allocate the respective shares of the respective recurring funds to respective time periods.

12. The computer-based method of claim 11, wherein the one or more first revenue recognition rules comprise a trigger condition defining a manner in which recurring revenue is recognized.

13. The computer-based method of claim 11, wherein the one or more first revenue recognition rules comprise a length of time attribute defining a duration in which a subscription remains valid.

14. The computer-based method of claim 11, wherein the one or more first revenue recognition rules comprise a start date attribute defining a date on which a subscription becomes valid.

15. The computer-based method of claim 11, wherein the one or more first revenue recognition rules comprise a rule defining a manner in which recurring revenue is recognized in accounting procedures.

16. The computer-based method of claim 11, wherein the one or more first revenue recognition rules comprise a rounding rule defining a manner in which recurring revenue is divided into different accounting periods.

17. The computer-based method of claim 11, wherein the one or more first revenue recognition rules comprise a transaction date rule defining a manner in which recurring revenue that is recognized in accounting procedures is reallocated with respect to a date associated with an accounting period.

18. The computer-based method of claim 11, wherein the one or more first revenue recognition rules comprise a merging rule defining a manner in which recurring revenue that has been previously recognized as revenue in a first accounting period in accounting procedures is recognized in a different accounting period.

19. The computer-based method of claim 11, further comprising generating a billing summary.

20. The computer-based method of claim 19, further comprising determining a difference in previously recognized revenue and reallocating recognized revenue for each accounting period in a plurality of accounting periods associated with a subscription.

* * * * *